(12) United States Patent
Kuwayama et al.

(10) Patent No.: US 9,616,970 B2
(45) Date of Patent: Apr. 11, 2017

(54) BICYCLE DERAILLEUR

(71) Applicant: Shimano Inc., Sakai, Osaka (JP)

(72) Inventors: Kazuya Kuwayama, Osaka (JP); Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 87 days.

(21) Appl. No.: 14/791,326

(22) Filed: Jul. 3, 2015

(65) Prior Publication Data
US 2017/0001685 A1    Jan. 5, 2017

(51) Int. Cl.
*F16H 9/00* (2006.01)
*F16H 59/00* (2006.01)
*F16H 61/00* (2006.01)
*F16H 63/00* (2006.01)
*B62M 9/1344* (2010.01)

(52) U.S. Cl.
CPC .................. *B62M 9/1344* (2013.01)

(58) Field of Classification Search
CPC .... B62M 9/1342; B62M 9/137; B62M 9/136; B62M 9/1344
USPC ..................................... 474/80, 82
See application file for complete search history.

(56) References Cited

U.S. PATENT DOCUMENTS

| | | | | |
|---|---|---|---|---|
| 3,910,136 A * | 10/1975 | Juy | ...................... | B62M 9/128 474/144 |
| 4,194,409 A * | 3/1980 | Nagano | .................. | B62M 9/136 474/80 |
| 4,237,743 A * | 12/1980 | Nagano | ................ | B62M 9/1342 474/140 |
| 4,362,522 A * | 12/1982 | Huret | ................... | B62M 9/1342 474/82 |
| 4,424,048 A * | 1/1984 | Shimano | ................ | B62M 9/137 474/82 |
| 4,452,593 A * | 6/1984 | Coue | .................... | B62M 9/1242 414/917 |
| 4,479,787 A * | 10/1984 | Bonnard | .............. | B62M 9/1342 474/127 |
| 4,486,182 A * | 12/1984 | Coue | .................... | B62M 9/1342 474/78 |
| 4,617,006 A * | 10/1986 | Nagano | ................ | B62M 9/1342 474/78 |
| 4,674,995 A * | 6/1987 | Iwasaki | .................. | B62M 9/136 474/80 |
| 4,756,704 A * | 7/1988 | Nagano | ................ | B62M 9/1342 474/144 |

(Continued)

*Primary Examiner* — Henry Liu
(74) *Attorney, Agent, or Firm* — Global IP Counselors, LLP

(57) ABSTRACT

A bicycle derailleur is basically provided with a base member, a chain guide, a linkage assembly and a first adjusting member. The chain guide is pivotally supported with respect to the base member between a retracted and an extended position. The linkage assembly includes a first link coupled to the base member about a first pivot axis and coupled to the chain guide about a second pivot axis. The linkage assembly includes a second link coupling the base member to the chain guide. The second link is farther from the bicycle frame than the first link when the base member is mounted to the bicycle frame. The first adjusting member is movably attached to the first link. The first adjusting member is configured to contact one of the base member and the chain guide to restrict movement of the chain guide at one of the retracted and extended positions.

20 Claims, 10 Drawing Sheets

(56) References Cited

U.S. PATENT DOCUMENTS

| | | | | |
|---|---|---|---|---|
| 5,037,355 A * | 8/1991 | Kobayashi | B62M 9/1342 | 474/82 |
| 5,104,358 A * | 4/1992 | Kobayashi | B62M 9/1342 | 474/82 |
| 5,312,301 A * | 5/1994 | Kobayashi | B62M 9/136 | 474/140 |
| 5,425,678 A * | 6/1995 | Richardson | B62M 9/1342 | 280/261 |
| 5,496,222 A * | 3/1996 | Kojima | B62M 9/1342 | 474/80 |
| 5,728,018 A * | 3/1998 | Terada | B62M 9/1344 | 474/127 |
| 5,779,581 A * | 7/1998 | Fujii | B62M 9/136 | 474/80 |
| 5,816,966 A * | 10/1998 | Yang | B62M 9/137 | 474/82 |
| 6,099,425 A * | 8/2000 | Kondo | B62M 9/1342 | 474/127 |
| 6,341,538 B1 * | 1/2002 | Takachi | B62M 9/137 | 188/24.19 |
| 6,471,610 B1 * | 10/2002 | Tseng | B62M 9/1342 | 474/80 |
| 6,491,597 B2 * | 12/2002 | Chen | B62M 9/1342 | 474/80 |
| 6,695,729 B2 * | 2/2004 | Ozaki | B62M 9/1344 | 474/80 |
| 7,014,584 B2 * | 3/2006 | Nanko | B62M 9/1342 | 474/80 |
| 7,081,058 B2 * | 7/2006 | Nankou | B62M 9/1348 | 474/80 |
| 7,186,194 B2 * | 3/2007 | Nankou | B62M 9/1348 | 474/80 |
| 7,189,173 B2 * | 3/2007 | Tsai | B62M 9/1342 | 474/82 |
| 7,438,657 B2 * | 10/2008 | Nakai | B62M 9/1342 | 474/80 |
| 7,438,658 B2 * | 10/2008 | Tetsuka | B62M 9/1342 | 474/122 |
| 7,677,998 B2 * | 3/2010 | Tetsuka | B62M 9/1342 | 474/80 |
| 7,722,486 B2 * | 5/2010 | Nanko | B62M 9/1342 | 474/103 |
| 7,914,407 B2 * | 3/2011 | Fukushima | B62M 9/1342 | 474/80 |
| 9,457,871 B2 * | 10/2016 | Kuwayama | B62M 9/1342 | |
| 2002/0165054 A1 * | 11/2002 | Chen | B62M 9/1342 | 474/82 |
| 2003/0083161 A1 * | 5/2003 | Ozaki | B62M 9/1342 | 474/80 |
| 2003/0100393 A1 * | 5/2003 | Nanko | B62M 9/1342 | 474/80 |
| 2006/0189421 A1 * | 8/2006 | Ichida | B62M 9/132 | 474/80 |
| 2007/0135249 A1 * | 6/2007 | Nanko | B62M 9/136 | 474/80 |
| 2008/0190234 A1 * | 8/2008 | Kawakami | B62M 9/1344 | 74/489 |
| 2008/0300076 A1 * | 12/2008 | Fukushima | B62M 9/1342 | 474/80 |

\* cited by examiner

BICYCLE DERAILLEUR

BACKGROUND

Field of the Invention

This invention generally relates to a bicycle derailleur. More specifically, the present invention relates to a bicycle derailleur with an adjustment that restricts movement of a chain guide at one of a retracted position and an extended position of the chain guide.

Background Information

A bicycle typically uses a chain drive transmission for transmitting a pedaling force to a rear wheel. The chain drive transmission of a bicycle often uses one or two derailleurs to selectively move a chain from one of a plurality of sprockets to another for changing speeds of the bicycle. A typical derailleur has a base member, a chain guide and a linkage assembly (e.g., a moving mechanism) coupled between the base member and the chain guide so that the chain guide moves laterally relative to the base member. A spring typically biases the chain guide to either an innermost or outermost position relative to the sprockets. A Bowden-type control cable is typically coupled between the derailleur and a conventional shift control device. The chain guide of the derailleur is moved laterally by moving the linkage assembly via the control cable. Some derailleurs have high and low adjustment screws that limit a range of movement of the chain guide so as to prevent the chain from being moved beyond the high and low sprockets.

SUMMARY

Generally, the present disclosure is directed to various features of a bicycle derailleur. In one feature, a bicycle derailleur is provided with an adjustment that restricts movement of a chain guide at one of a retracted position and an extended position of the chain guide.

In view of the state of the known technology and in accordance with a first aspect of the present disclosure, a bicycle derailleur is provided that derailleur basically comprises a base member, a chain guide, a linkage assembly and a first adjusting member. The base member is configured to be mounted to a bicycle frame. The chain guide is pivotally supported with respect to the base member between a retracted position and an extended position that is farther from the bicycle frame than the retracted position. The linkage assembly includes a first link pivotally coupled to the base member about a first pivot axis and pivotally coupled to the chain guide about a second pivot axis. The linkage assembly includes a second link pivotally coupling the base member to the chain guide. The second link is farther from the bicycle frame than the first link in a state where the base member is mounted to the bicycle frame. The first adjusting member is movably attached to the first link. The first adjusting member is configured to contact one of the base member and the chain guide to restrict a movement of the chain guide at one of the retracted position and the extended position of the chain guide.

In accordance with a second aspect of the present invention, the bicycle derailleur according to the first aspect is configured so that the first adjusting member is disposed between the first and second pivot axes as viewed from a direction parallel to the first pivot axis.

In accordance with a third aspect of the present invention, the bicycle derailleur according to the second aspect is configured so that the base member includes a connecting portion through which the first pivot axis passes and a contacting portion protruding from the connecting portion. The contacting portion is configured to contact the first adjusting member when the chain guide is positioned in the retracted position.

In accordance with a fourth aspect of the present invention, the bicycle derailleur according to the first aspect is configured so that the first adjusting member is configured to adjust the retracted position.

In accordance with a fifth aspect of the present invention, the bicycle derailleur according to the fourth aspect is configured so that the first adjusting member includes a first tool access portion and a first threaded portion adjustably threaded into the first link. The first tool access portion is disposed closer to the chain guide than the first threaded portion.

In accordance with a sixth aspect of the present invention, the bicycle derailleur according to the fifth aspect is configured so that the second adjusting member is configured to adjust the extended position and is movably attached to the first link.

In accordance with a seventh aspect of the present invention, the bicycle derailleur according to the sixth aspect is configured so that the second adjusting member includes a second threaded portion and a second tool access portion. The second threaded portion is threaded into the first link. The second tool access portion is disposed farther from the chain guide than the second threaded portion.

In accordance with an eighth aspect of the present invention, the bicycle derailleur according to the seventh aspect is configured so that the first and second adjusting members are disposed on the first link so as to be aligned to each other in a direction parallel to the first pivot axis.

In accordance with a ninth aspect of the present invention, the bicycle derailleur according to the eighth aspect is configured so that the second threaded portion has a distal end that is configured to contact one of the base member and the chain guide when the chain guide is positioned to the extended position.

In accordance with a tenth aspect of the present invention, the bicycle derailleur according to the sixth aspect is configured so that the second adjusting member includes a second threaded portion and a second tool access portion. The second threaded portion is threaded into the first link. The second tool access portion is disposed closer to the chain guide than the second threaded portion.

In accordance with an eleventh aspect of the present invention, the bicycle derailleur according to the tenth aspect is configured so that the first pivot axis is disposed between the first and second adjusting members as viewed from a direction parallel to the first pivot axis.

In accordance with a twelfth aspect of the present invention, the bicycle derailleur according to the fourth aspect is configured so that the linkage assembly includes an extension link, an input link and a connecting link. The extension link is operatively coupled to the first link and pivotally coupled to the base member about the first pivot axis. The in input link is pivotally supported relative to the base member about a third pivot axis. The connecting link pivotally connected to the input link about a fourth pivot axis and pivotally connected to the extension link about a fifth pivot axis such that the linkage assembly moves in response to movement of the input link.

In accordance with a thirteenth aspect of the present invention, the bicycle derailleur according to the twelfth aspect is configured so that the extension ink is operatively coupled to the first link via a second adjusting member movably attached to one of the first link and the extension link. The second adjusting member is configured to adjust a relative angular orientation between the first link and the extension link about the first pivot axis.

In accordance with a fourteenth aspect of the present invention, the bicycle derailleur according to the seventh aspect is configured so that the second adjusting member is disposed between the first and second pivot axes as viewed from a direction parallel to the first pivot axis.

In accordance with a fifteenth aspect of the present invention, the bicycle derailleur according to the fourteenth aspect is configured so that the first and second adjusting members are disposed on the first link so as to be aligned to each other in the direction parallel to the first pivot axis.

In accordance with a sixteenth aspect of the present invention, the bicycle derailleur according to the fourteenth aspect is configured so that the first and second adjusting members are disposed adjacent to each other.

In accordance with a seventeenth aspect of the present invention, the bicycle derailleur according to the first aspect is configured so that the first link includes a pivoting portion pivotally coupled to the base member about the first pivot axis and a first attachment portion to which the first adjusting member is attached. The first attachment portion is disposed on an upstream side of the pivoting portion with respect to a chain running direction of the chain guide.

In accordance with an eighteenth aspect of the present invention, the bicycle derailleur according to the seventeenth aspect is configured so that the bicycle derailleur further comprises a second adjusting member configured to adjust of the other of the retracted position and the extended position of the chain guide. The first link includes a second attachment portion to which the second adjusting member is attached. The second attachment portion is disposed on the upstream side of the pivoting portion with respect to the chain running direction of the chain guide.

In accordance with a nineteenth aspect of the present invention, the bicycle derailleur according to the first aspect is configured so that the bicycle derailleur is a bicycle front derailleur.

In accordance with a twentieth aspect of the present invention, the bicycle derailleur according to the nineteenth aspect is configured so that the first pivot axis is disposed on a vertically upper side of the second pivot axis in a state where the base member is mounted to the bicycle frame.

Also other objects, features, aspects and advantages of the disclosed bicycle derailleur will become apparent to those skilled in the art from the following detailed description, which, taken in conjunction with the annexed drawings, discloses several embodiments of the bicycle derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
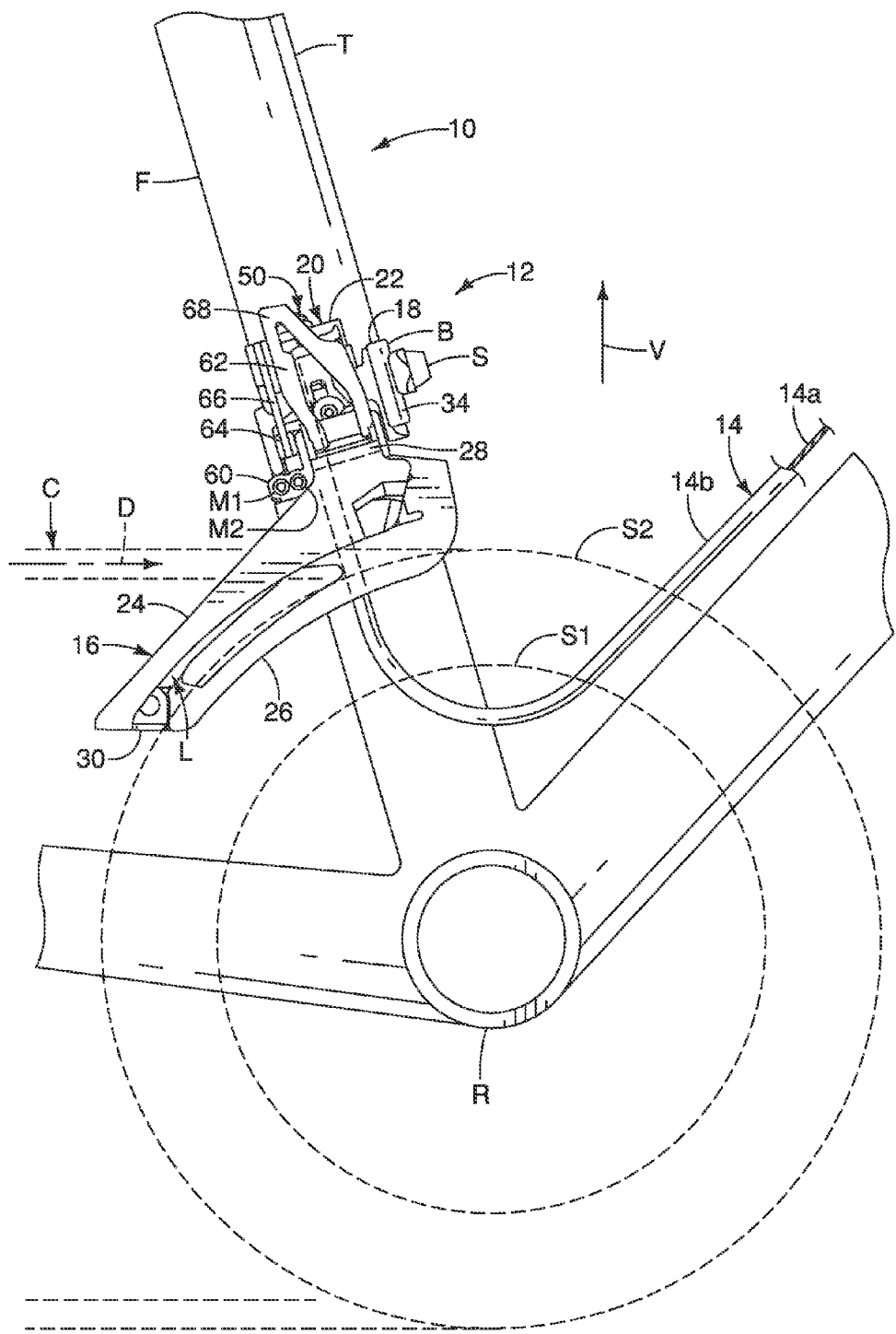
FIG. 1 is a partial side elevational view of a bicycle frame with a bicycle front derailleur mounted thereto in accordance with a first illustrated embodiment.

Referring initially to FIG. 1, a bicycle 10 is illustrated that is equipped with a bicycle derailleur 12 in accordance with a first embodiment. Here, the derailleur 12 is mounted to a bicycle frame F of the bicycle 10. In particular, the derailleur 12 is mounted to a seat tube T of the bicycle frame P by a bracket B. The derailleur 12 is a cable operated derailleur that is operated in response to the operation of a shifter (not shown) in a conventional manner. In particular, the derailleur 12 is operated by an operation cable 14 that has a first end connected to the derailleur 12 and a second end connected to the shifter. The operation cable 14 is a conventional bicycle operation cable 14 that has an inner wire 14a covered by an outer casing 14b. In other words, the operation cable 14 is a Bowden type operation cable 14 (i.e. a mechanical cable) in which the inner wire 14a is slidably received within the outer casing 14b. The shifter operates the derailleur 12 by selectively pulling and releasing the inner wire 14a in response to operation of a shifter. In the illustrated embodiment, the bicycle derailleur 12 is a bicycle front derailleur. Specifically, the derailleur 12 is a bottom-pull type of front derailleur such that the inner wire 14a of the operation cable 14 is pulled downwardly. The operation cable 14 is often routed across the top or along a bottom of a bottom bracket shell R of the bicycle frame F on an operation cable guide (not shown), which redirects the operation cable 14 upward along a down tube of the bicycle frame F to the shifter in a conventional manner. Thus, in the first illustrated embodiment, the front derailleur 12 is a bottom-pull derailleur.

Referring to FIGS. 2 to 10, the bicycle derailleur 12 basically comprises a chain guide 16, a base member 18, a linkage assembly 20 and a first adjusting member M1. Basically, the base member 18 is fixedly mounted to the bicycle frame F in a conventional manner. The chain guide 16 is movably supported to the base member 18 by the linkage assembly 20 for moving the chain guide 16 relative to the base member 18. The inner wire 14a is attached to an input link 22 of the linkage assembly 20, which receives the input force from a gear shifting operation to shift the chain guide 16. The input link 22 is pivotally mounted on the base member 18. In this way, operation of the operation cable 14 causes the chain guide 16 to move with respect to the base member 18.

Referring back to FIG. 1, the chain guide 16 is pivotally supported with respect to the base member 18 to move a chain C in a transverse direction with respect to a center longitudinal plane of the bicycle frame F. Specifically, the chain guide 16 moves the chain C between a retracted position and an extended position. In the illustrated embodiment, the extended position is farther from the bicycle frame F than the retracted position in the transverse direction. As shown in the Figures, during riding, the chain C runs in a chain running direction D such that a front side of the derailleur 12 constitutes a downstream side of the chain running direction D. The rear side of the derailleur constitutes an upstream side of the chain running direction D.

Here, the bicycle frame F is provided with a pair of chain rings S1 and S2. Of course, the bicycle frame F can be provided with more than two chain rings as needed and/or desired. Therefore, the chain guide 16 is designed to shift the chain C between the chain rings S1 and S2 as the chain guide 16 moves between the retracted and extended position depending on whether the operation cable 14 is pulled or released. Thus, in the first illustrated embodiment, when the chain guide 16 is in the retracted position (best depicted in FIGS. 7 and 9), the derailleur 12 shifts to the extended position (best depicted in FIGS. 8 and 10) in response to the operation cable 14 being pulled. On the other hand, in the first illustrated embodiment, when the chain guide 16 is in the extended position, the derailleur 12 shifts to the retracted position in response to the operation cable 14 being released.

Figure 2:
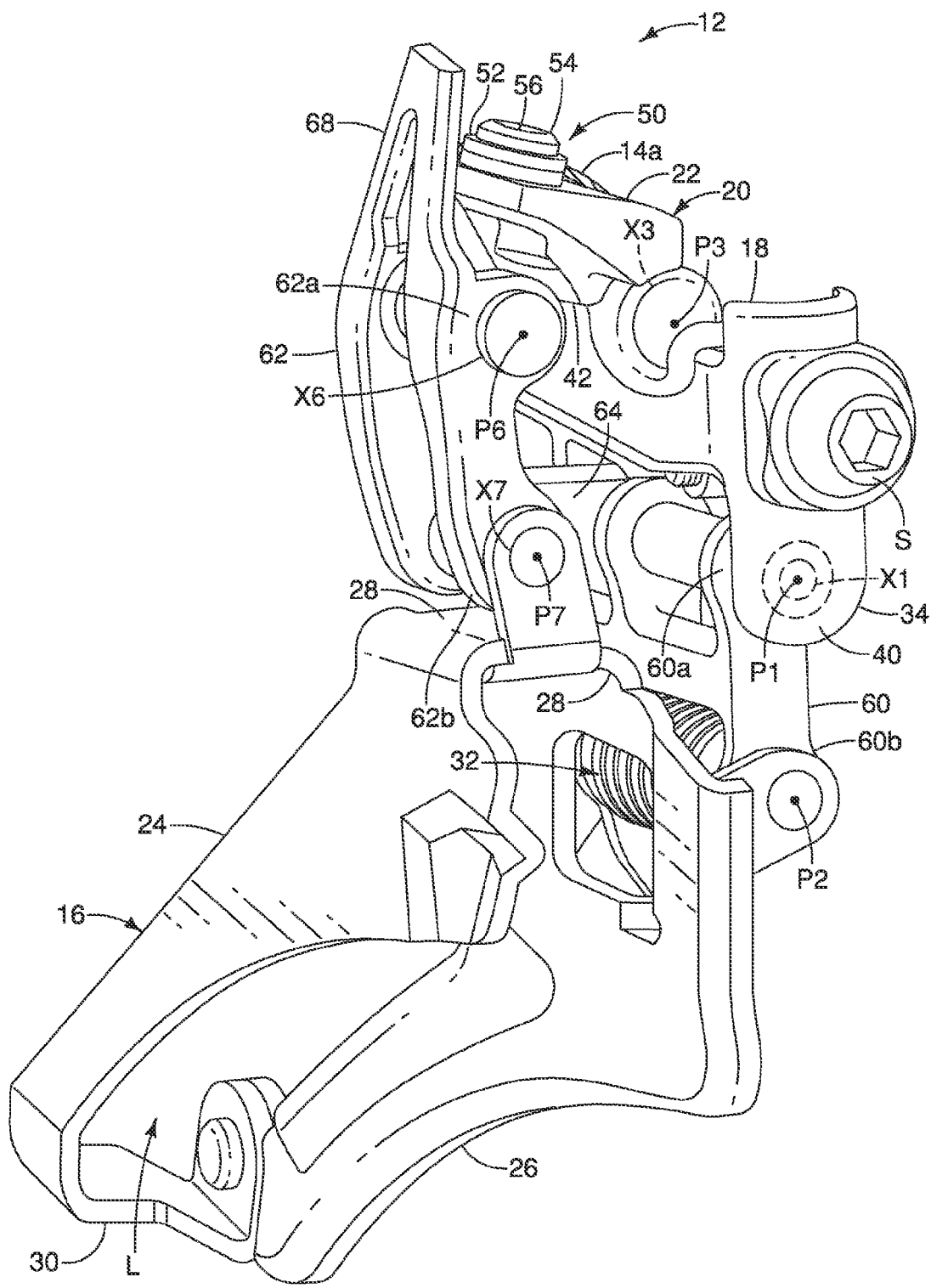
FIG. 2 is a front outside perspective view of the front derailleur illustrated in FIG. 1.
Figure 3:
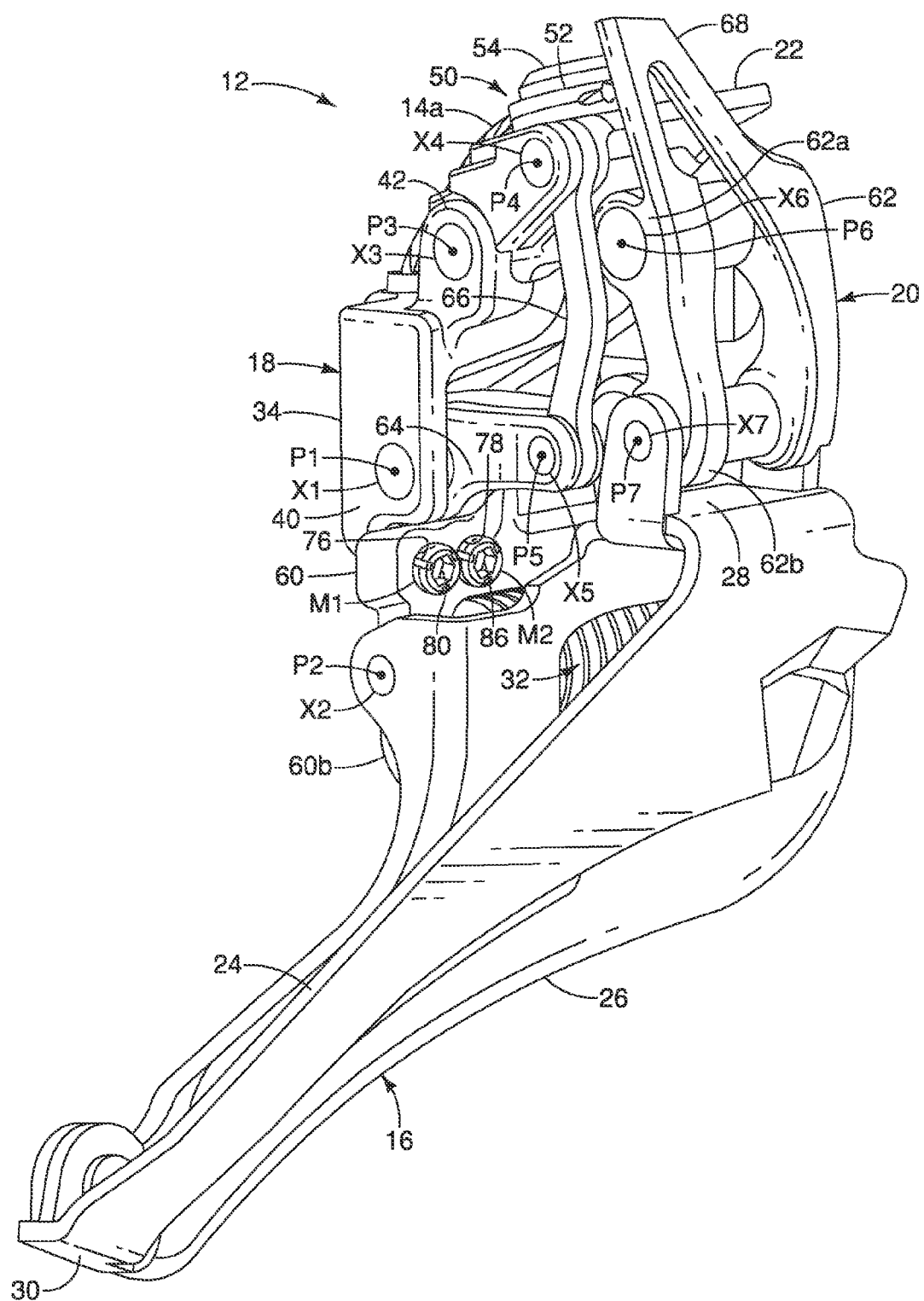
FIG. 3 is a rear outside perspective view of the front derailleur illustrated in FIGS. 1 and 2.
Figure 4:
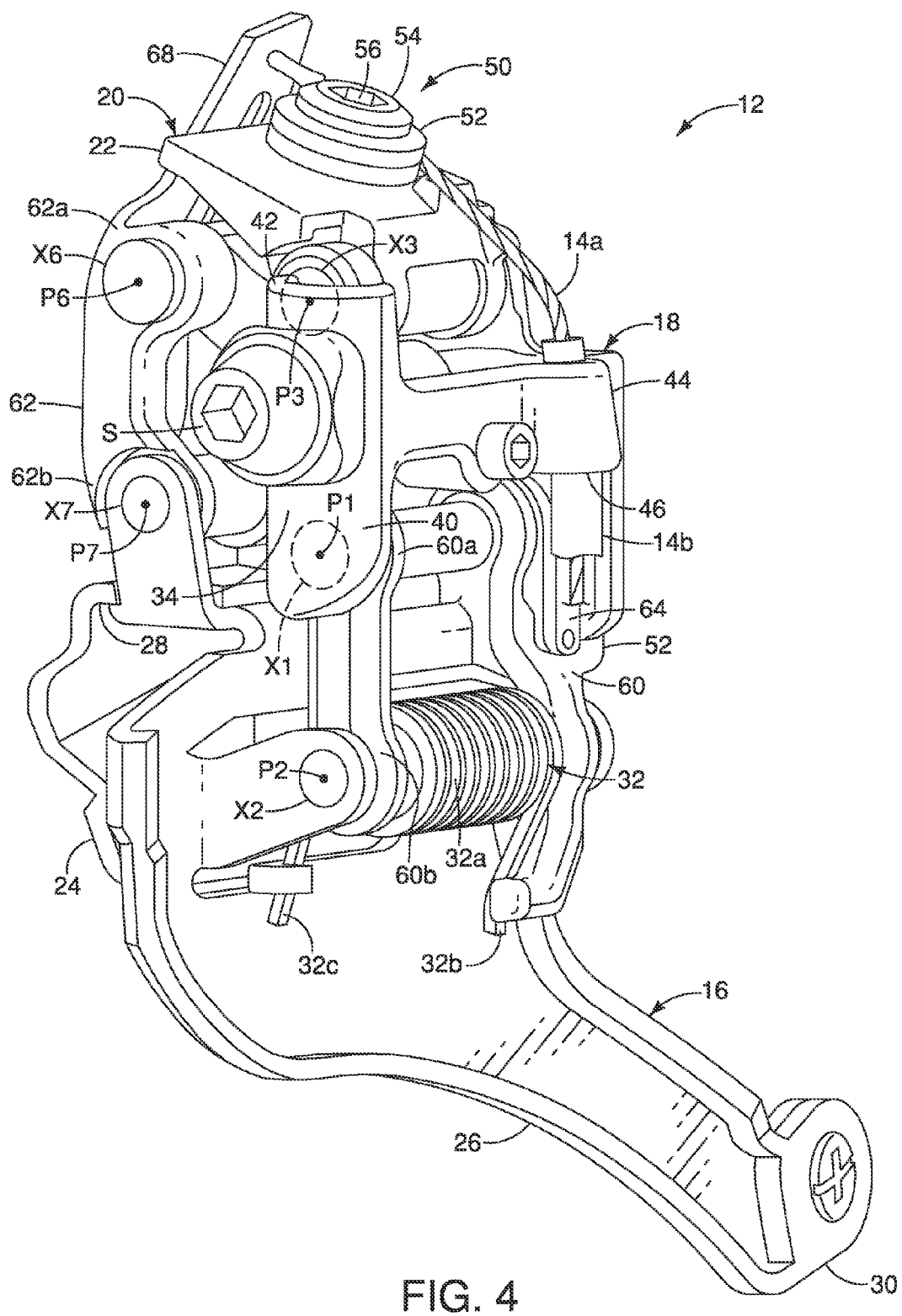
FIG. 4 is a front inside perspective view of the front derailleur illustrated in FIGS. 1 to 3.

As best seen in FIGS. 2 to 4, the chain guide 16 includes a first guide plate 24 and a second guide plate 26. The first and second guide plates 24 and 26 for a chain receiving slot L therebetween. The first guide plate 24 is connected to the second guide plate 26 by a first or upper connecting portion 28 and a second or rear-end connecting portion 30. In the illustrated embodiment, the first guide plate 24, the second guide plate 26, the first connecting portion 28 and the second connecting portion 30 are formed as a one-piece, unitary member by bending a single piece of a metal sheet. The chain guide 16 further includes a U-shaped attachment part that is fixed (e.g., riveted) to the first connecting portion 28.

Figure 6:
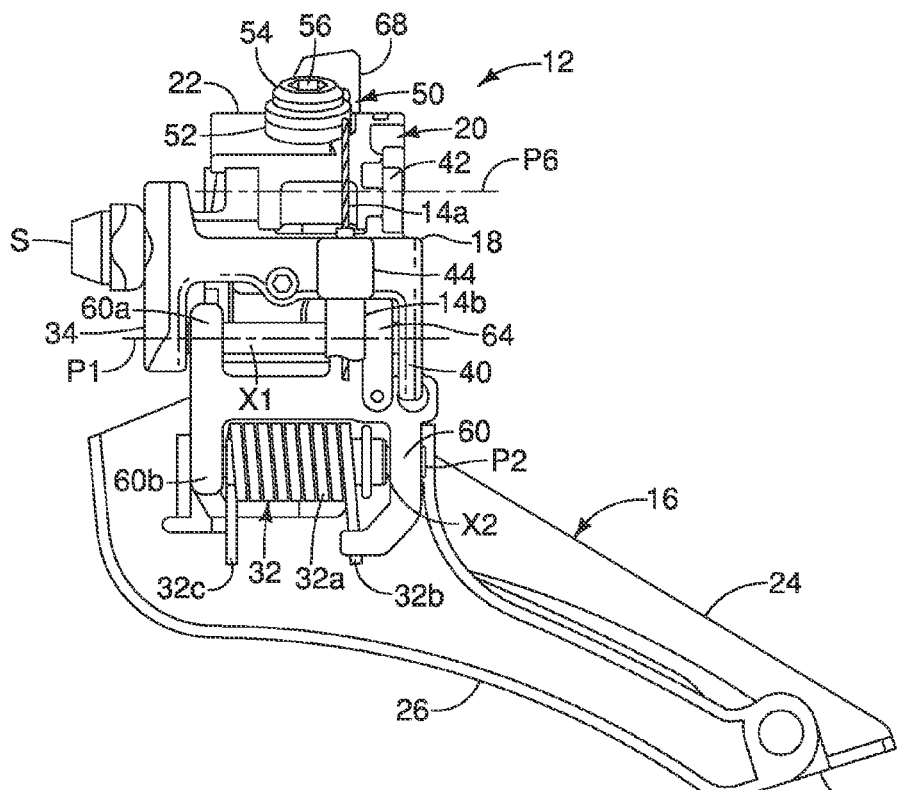
FIG. 6 is an inside elevational view of the front derailleur illustrated in FIGS. 1 to 5.

In the first illustrated embodiment, as best seen in FIGS. 4 and 6, the chain guide 16 is biased in the retracted position relative to the base member 18 by a biasing member 32. The biasing member 32 has a coiled portion 32a that is disposed around a pivot axle of the linkage assembly 20. The biasing member 32 has a first free end portion 32b that contacts the linkage assembly 20 and a second free end portion 32c that contacts the second guide plate 26. Thus, the biasing member 32 is operatively disposed between the base member 18 and the chain guide 16. In the illustrated embodiment, the biasing member 32 biases the chain guide 16 towards the retracted position so as to position the chain guide 16 over the small chain ring S1. Thus, in the first illustrated embodiment, the retracted position constitutes an initial state or rest position of the chain guide 16. In particular, the biasing member 32 maintains the chain guide 16 at the retracted position when the operation cable 14 is released or detached from the bicycle front derailleur 12.

In the first illustrated embodiment, the biasing member 32 and the linkage assembly 20 are arranged with respect to the base member 18 and the chain guide 16 to form a down-swing derailleur, as previously mentioned. A down-swing derailleur refers to a derailleur that has its chain guide mounted at the bottom pivot axes of the linkage assembly that carries it. The derailleur 12 of the illustrated embodiment is also a bottom-pull derailleur because the operation cable 14 is pulled in a downward direction to move the chain guide 16 against the biasing force of the biasing member 32 while the bicycle frame F is in a level, upright position.

The base member 18 will now be discussed in greater detail. Basically, the derailleur 12 is mounted to the bicycle frame F at the base member 18. Thus, the base member 18 is configured to be mounted to the bicycle frame F. The base member 18 includes a bicycle mounting portion 34. The bicycle mounting portion 34 is configured to be coupled to the bracket B on the seat tube T of the bicycle frame F by a mounting screw S. The screw S is threaded into a threaded hole (not shown) of the bicycle mounting portion 34 as shown in FIG. 1. While the bicycle mounting portion 34 is illustrated as a "braze-on type" of mounting structure, the bicycle mounting portion 34 is not limited to this type of mounting structure. For example, the bicycle mounting portion 34 of the bicycle derailleur 12 can be replaced with a base member 18 having a "clamp band type" of a bicycle mounting portion 34, if needed and/or desired.

As best seen in FIGS. 3 and 4, the base member 18 includes a lower connecting portion 40 and an upper connecting portion 42 that pivotally support the linkage assembly 20 as explained below. As best seen in FIG. 4, the base member 18 includes an outer casing receiving part 44 configured to receive an outer casing of the operation cable 14. Specifically, the outer casing receiving part 44 is disposed on an inner facing side of the base member 18, as best seen in FIGS. 4 and 6. Here in the illustrated embodiment, the outer casing receiving part 44 and the base member 18 are formed as a one-piece member. However, it will be apparent from this disclosure that the outer casing receiving part 44 can be a separate member from the base member 18 that is attached to the base member 18. As shown, the outer casing receiving part 44 at least partially protrudes from the base member 18 toward the bicycle frame F in the state where the base member 18 is mounted to the bicycle frame F.

As seen in FIG. 4, the input link 22 includes a cable attachment part 50 that is configured to be attached to the operation cable 14. As shown, the cable attachment part 50 includes a washer 52, a fixing bolt 54 and a threaded bore (not shown) formed in a body of the input link 22. The fixing bolt 54 includes a tool engagement structure 56 (e.g., a hex recess) for tightening or loosening the fixing bolt 54 into the threaded bore. Thus, the fixing bolt 54 screws into the threaded bore of the body of the input link 22. In this way, the input link 22 is configured to be connected to the operation cable 14 to move the input link 22 in response to operation of the operation cable 14. At the same time, the linkage assembly 20 moves in response to movement of the input link 22.

With reference to FIGS. 2 to 9, the linkage assembly 20 will now be discussed in further detail. Basically, the linkage assembly 20 includes a first link 60 and a second link 62.

The first and second links 60 and 62 swingably support the chain guide 16 on the base member 18. The first and second links 60 and 62 are pivotally coupled to the chain guide 16 and the base member 18 to define a four bar linkage that pivotally connects the chain guide 16 to the base member 18. In the first illustrated embodiment, the first link 60 of the linkage assembly 20 is the inner link and the second link 62 is the outer link. In other words, the second link 62 is farther from the bicycle frame than the first link 60 in a state where the base member 18 is mounted to the bicycle frame F.

In the first illustrated embodiment, the linkage assembly 20 further includes the input link 22, an extension link 64 and a connecting link 66. The input link 22, the extension link 64 and the connecting link 66 are provided to transmit the pulling force of the operation cable 14 to the first and second links 60 and 62 such that the chain guide 16 swings on the base member 18.

As best seen in FIG. 3, the front derailleur 12 includes a plurality of pivot axles X1, X2, X3, X4, X5, X6 and X7. The pivot axles X1 to X7 define a plurality of pivot axes P1, P2, P3, P4, P5, P6 and P7, respectively. In this way, the input link 22, the first link 60, the second link 62 the extension link 64 and the connecting link 66 all pivot congruously to shift the chain guide 16 between the retracted and the extended positions. In the Figures, the pivot axes P1 to P7 are each indicated by a reference letter "P" followed by a reference numeral corresponding to the pivot axle that defines the pivot axis. For example, the first pivot axis P1 is defined by the first pivot axle X1, and so on. In the illustrated embodiment, the derailleur 12 includes seven pivot axles X1 to X7, each defining a corresponding one of the pivot axes P1 to P7.

In this regard, the first link 60 is pivotally coupled to the base member 18 at the first pivot axis P1. As best seen in FIGS. 4 and 6, the first link 60 includes a first pivoting portion 60a pivotally coupled to the base member 18 about the first pivot axis P1 by the first pivot axle X1. The first link 60 also includes a second pivoting portion 60b pivotally coupled to the chain guide 16 about the second pivot axis P2. Thus, the first link 60 is pivotally coupled to the chain guide 16 about the second pivot axis P2 by the second pivot axle X2. As a result, the first pivot axis P1 is disposed on a vertically upper side of the second pivot axis P2 in a state where the base member 18 is mounted to the bicycle frame F.

The input link 22 is pivotally supported relative to the base member 18 about the third pivot axis P3 by the third pivot axle X3. In this way, the input link 22 is pivoted with respect to the base member 18. A first end of the connecting link 66 is pivotally connected to the input link 22 at the fourth pivot axis P4 by the fourth pivot axle X4. A second end of the connecting link 66 is pivotally connected to the extension link 64 at the fifth pivot axis P5 by the fifth pivot axle X5. In this way, the pivotally movement of the input link 22 is transmitted to the extension link 64 via the connecting link 66. Here, the extension link 64 is pivotally mounted on the base member 18 by the first pivot axle X1.

Figure 5:
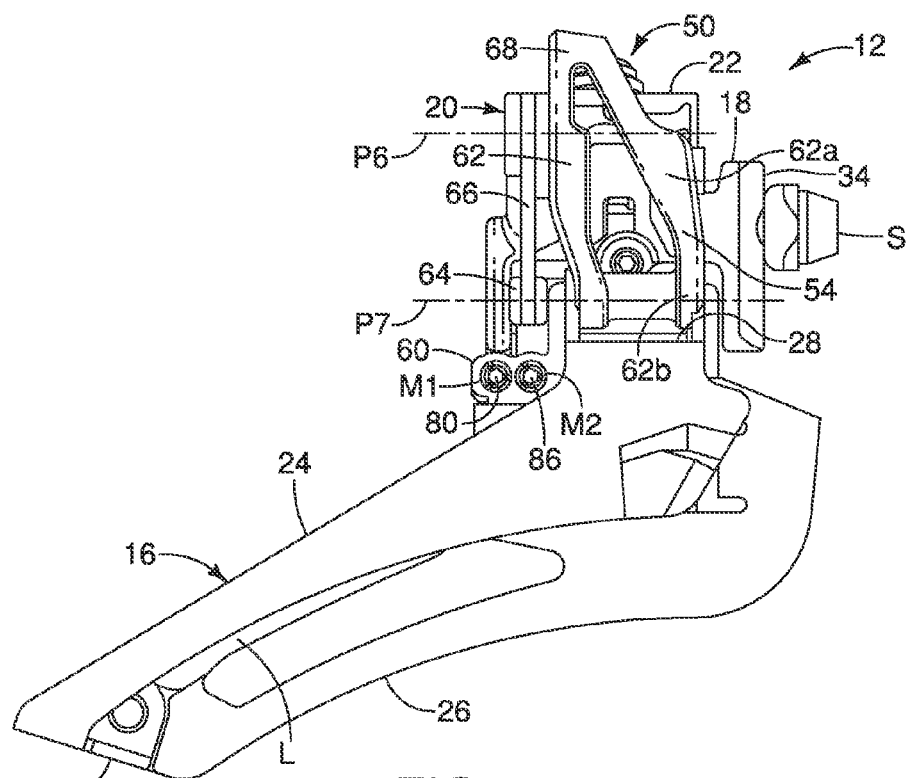
FIG. 5 is an outside elevational view of the front derailleur illustrated in FIGS. 1 to 4.

As best seen in FIGS. 2, 3 and 5, the second link 62 is pivotally coupled to the base member 18 at the sixth pivot axis P6 by the sixth pivot axle X6. Specifically, the second link 62 includes a first pivoting portion 62a pivotally coupled to the base member 18 by the sixth pivot axle X6. The second link 62 further includes a second pivoting portion 62b pivotally coupled to the chain guide 16 by the seventh pivot axle X7 at the seventh pivot axis P7. In this way, the second link 62 pivotally couples the base member 18 to the chain guide 16. As a result of this arrangement, the first link 60 and the second link 62 are pivotally coupled to the base member 18 by the first and sixth pivot axle X1, while the second link 62 is pivotally coupled to the base member 18 by the sixth pivot axle X6. The chain guide 16 is pivotally supported by the second and seventh pivot axles X2 and X7.

As best seen in FIGS. 3 and 4, the base member 18 includes a lower connecting portion 40 for receiving the first pivot axle X1 to pivotally support the linkage assembly 20 to the base member 18. The base member 18 further includes an upper connecting portion 42 that further pivotally supports the linkage assembly 20 to the base member 18 as well as the input link 22. The lower connecting portion 40 is a pair of projections that include a pair of mounting holes that are co-axially aligned to receive the first pivot axle X1 therethrough. Thus, the first pivot axis P1 passes through the lower connecting portion 40 of the base member 18. The first pivot axle XI pivotally attaches the first link 60 of the linkage assembly 20 to the base member 18. The upper connecting portion 42 is a pair of projections that include a pair of second mounting holes that are co-axially aligned to receive the sixth pivot axle X6 therethrough. The sixth pivot axle X6 pivotally attaches the second link 62 of the linkage assembly 20 to the base member 18. In this way, the first and second links 60 and 62 are swingably mounted to the base member 18 by the first and sixth pivot axles X1 and X6.

When the chain guide 16 is in the retracted position, the first and second pivot axes P1 and P2 are substantially aligned vertically with respect to the base member 16 and the linkage assembly 20 as viewed in an axial direction of the first and second pivot axes P1 and P2. The first link 60 includes a first adjusting member M1 and a second adjusting member M2 attached thereto. The first and second adjusting members M1 and M2 are configured to adjust a movement amount of the chain guide 16. The first and second adjusting member M1 and M2 will be discussed in greater detail at a later point.

In the illustrated embodiment, the second link 62 has an upper protruding portion 68 that extends from the sixth pivot axis P6 upward. The upper protruding portion 68 is disposed adjacent to the input link 22. The upper protruding portion 68 serves as a shield member to protect the space between the input link 22 and the second link 62 from debris. During a gear shifting operation to move the chain C from the first sprocket S1 to the second sprocket S2, the input link 22 receives a pulling force from the operation cable 14, which is transmitted to the first link 60 via the extension link 64 and the connecting link 66. In this way, the amount of force transmitted from the input link 22 to the second link 62 is reduced as compared to a conventional front derailleur in which the operation cable is attached to the outer link (the second link). Because the operation cable 14 is not directly attached to the second link 62 of the derailleur 12, the second link 62 experiences less strain during a gear shifting operation as compared to conventional front derailleurs. Thus, the second link 62 of the illustrated embodiment can be constructed out of plastic, instead of having to be constructed out of metal. This construction of the second link 62 allows the derailleur 12 to be more lightweight.

Figure 9:
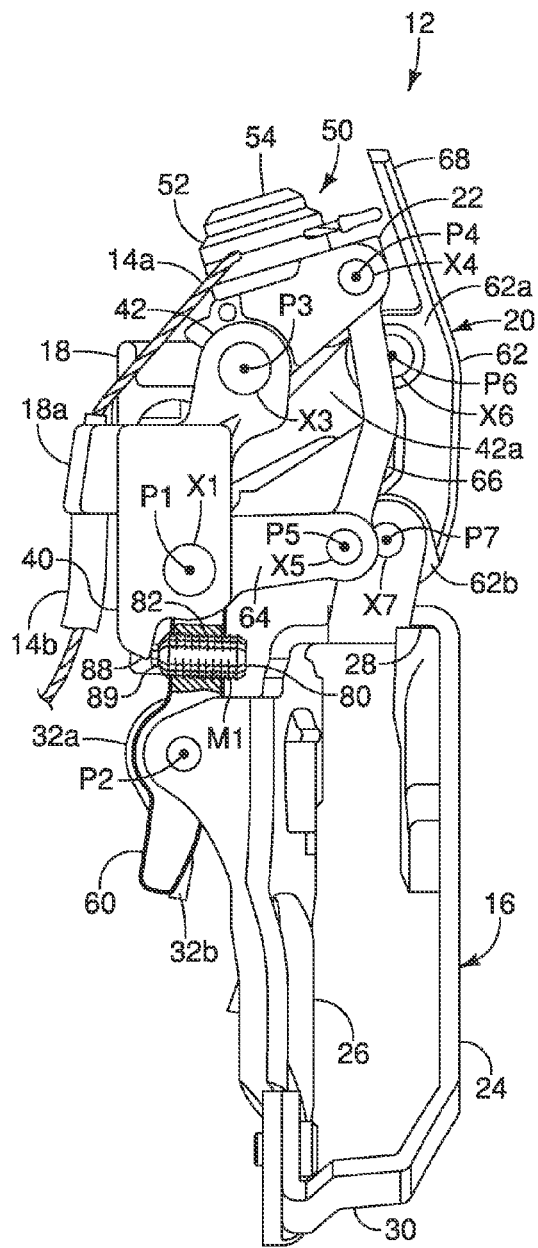
FIG. 9 is a rear elevational view of the front derailleur illustrated in FIGS. 1 to 8 with the chain guide in the retracted position.
Figure 10:
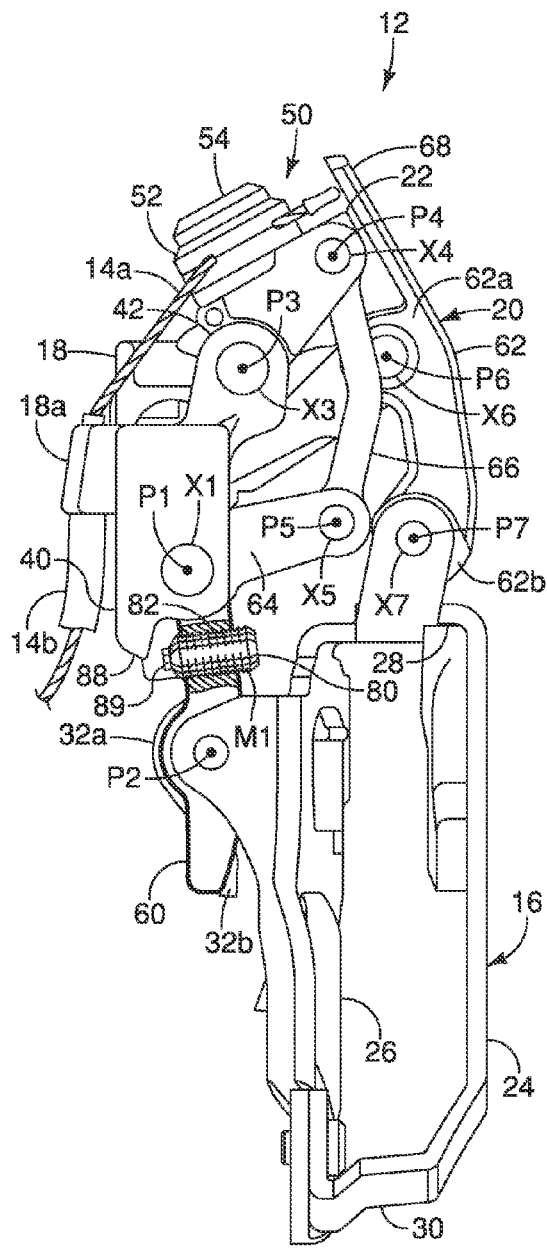
FIG. 10 is a rear elevational view of the front derailleur illustrated in FIGS. 1 to 9 with the chain guide in the extended position.
Figure 11:
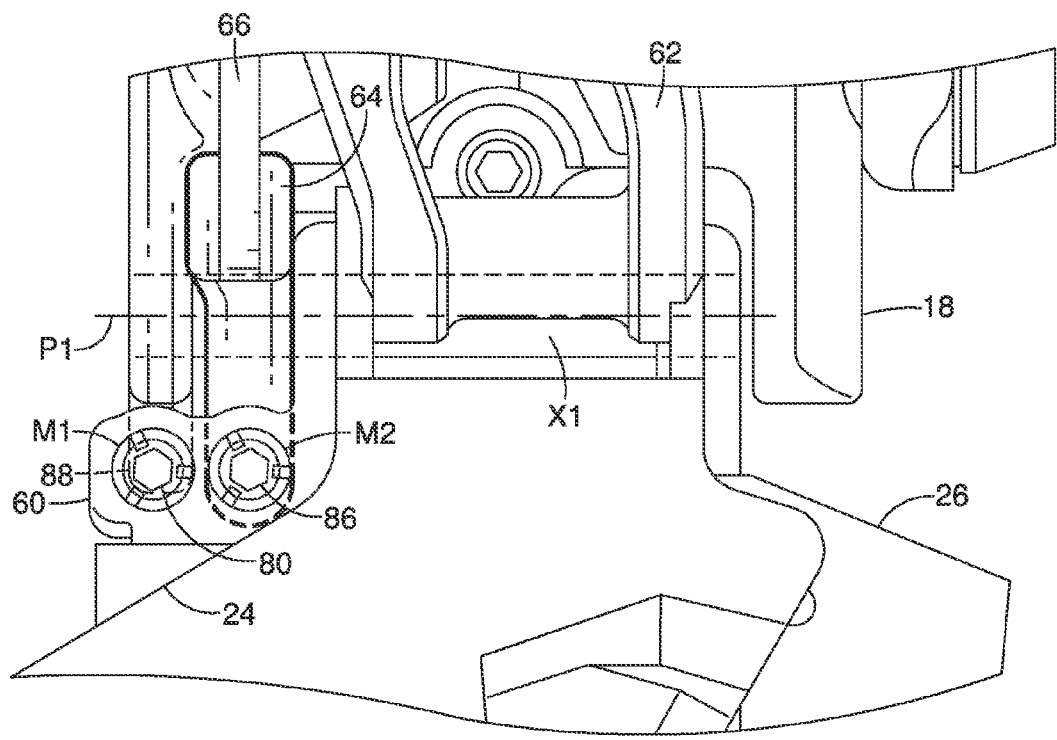
FIG. 11 is an inside elevational view of a portion of the front derailleur illustrated in FIGS. 1 to 10 showing the first and second adjusting members attached to the first link.

As previously mentioned, the linkage assembly 20 further includes the extension link 64, the input link 22 and the connecting link 66. During a pulling operation of the operation cable 14, the input link 22 pivots about the third pivot axis P3 in a counterclockwise direction, as viewed from the upstream side of a chain running direction D as seen in FIGS. 9 and 10, to shift the derailleur 12 from the retracted position to the extended position. As a result of this pivotal movement of the input link 22, the input link 22 exerts an input force on the linkage assembly 20 to shift the chain guide 16 between the retracted and extended positions. As the input link 22 pivots about the third pivot axis P3, the linkage assembly 20 moves in response to movement of the input link 22.

Figure 7:
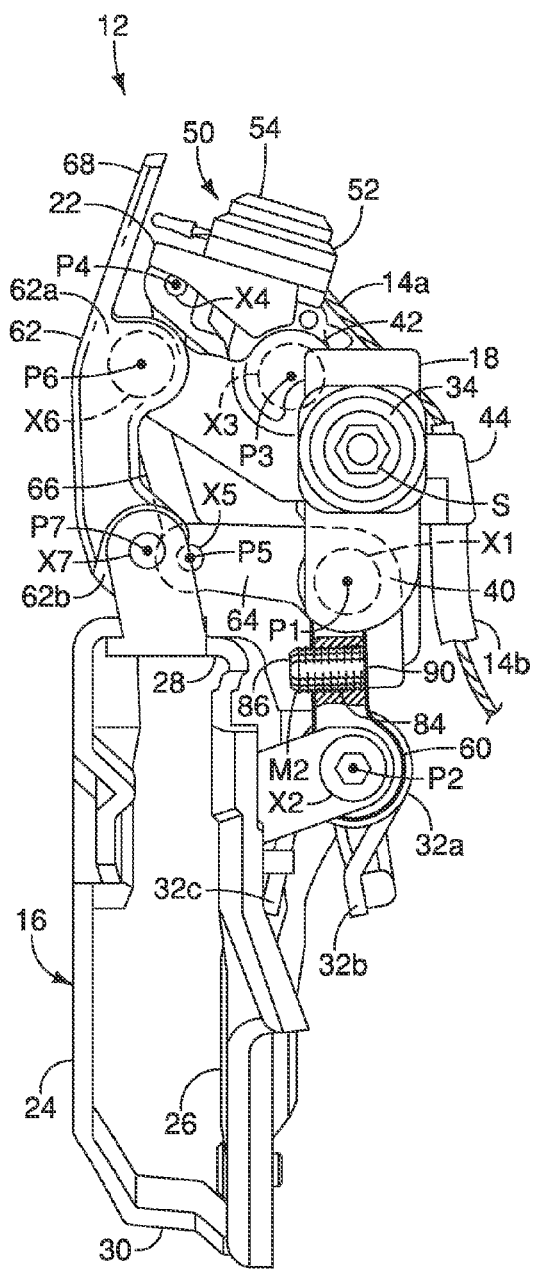
FIG. 7 is a front elevational view of the front derailleur illustrated in FIGS. 1 to 6 with the chain guide in the retracted position.
Figure 8:
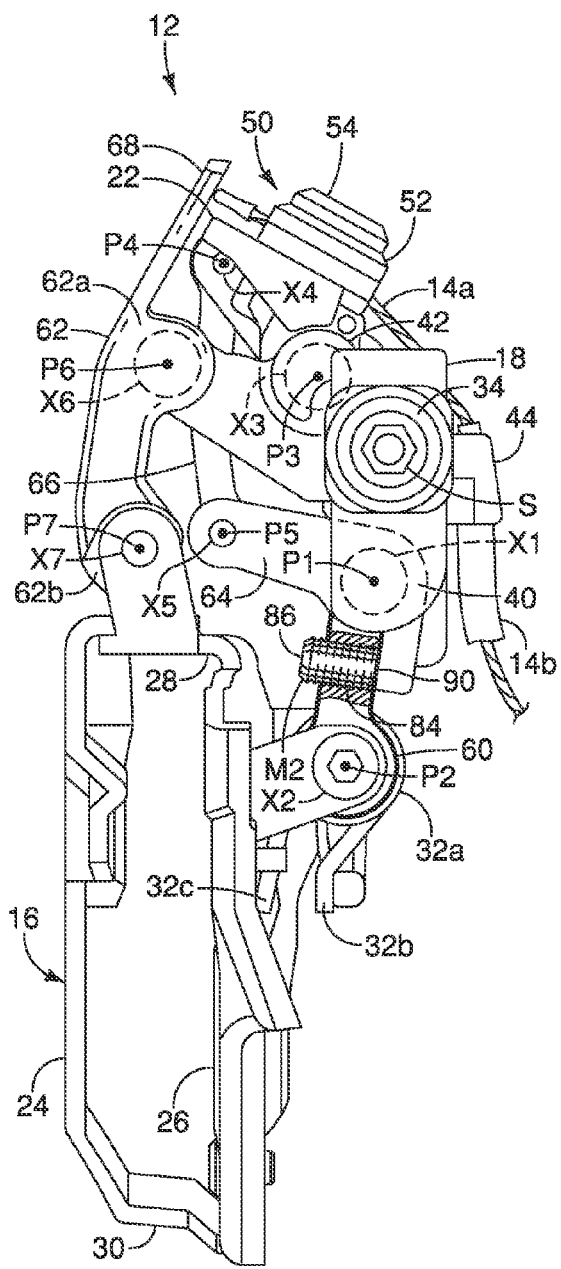
FIG. 8 is a front elevational view of the front derailleur illustrated in FIGS. 1 to 7 with the chain guide in the extended position.

As best seen in FIGS. 3, 7 and 8, a first end of the extension link 64 is operatively coupled to the first link 60 and pivotally coupled to the base member 18 about the first pivot axis P1. A second end of the extension link 64 is pivotally coupled to the connecting link 66 about the fifth pivot axis P5.

Referring to FIGS. 3, 9 and 10, the connecting link 66 extends substantially vertically between the input link 22 and the extension link 64. The connecting link 66 is pivotally connected to the input link 22 about the fourth pivot axis P4 at a first end of the connecting link 66, and pivotally connected to the extension link 64 about the fifth pivot axis P5 at a second end of the connecting link 66.

As shown, the extension link 64 and the connecting link 66 are configured such that the fourth pivot axis P4 and the fifth pivot axis P5 are spaced apart by a first distance that is longer than a second distance extending between the fifth pivot axis P5 and first pivot axis P1. In other words, the connecting link 66 is preferably longer than the extension link 64. In the illustrated embodiment, as best seen in FIG. 3, the extension link 64 and the connecting link 66 are disposed closer to the upstream side of the chain running direction D than the second link 62 in a state where the base member 18 is mounted to the bicycle frame F. During operation of the operation cable 14, the input link 22 pivots about the third pivot axis P3 to push or pull the connecting link 66, which in turn pivots the extension link 64 about the first pivot axis P1. The extension link 64 then transfers this input force to the first link 60, which shifts the chain guide 16 from the retracted position to the extended position, or vice versa.

Referring now to FIGS. 3, 5, and 7 to 12, the first and second adjusting members M1 and M2 will now be discussed in greater detail. As previously mentioned, the first and second adjusting members M1 and M2 are disposed on the first link 60 of the linkage assembly 20. In the illustrated embodiment, the first and second adjusting members M1 and M2 are adjustment screws configured to allow a rider to adjust the range of movement of the chain guide 16 during gear shifting as well as the angular orientation of the linkage assembly 20. In the illustrated embodiment, the first adjusting member M1 is configured to restrict a movement of the chain guide 16 at one of the retracted position and the extended position of the chain guide 16. The second adjusting member M2 is configured to adjust of the other of the retracted position and the extended position of the chain guide 16. In other words, the first and second adjusting members M1 and M2 are configured to adjust the range of movement of the chain guide stroke between the retracted position and the extended position during a gear shifting operation. In addition, adjustment of the first and second adjusting members M1 and M2 permits a rider to operatively configure the derailleur 12 such that the bicycle chain C runs optimally between the chain receiving slot L of the chain guide 16. In the illustrated embodiment, the first and second adjusting members M1 and M2 are threaded screws.

Figure 12:
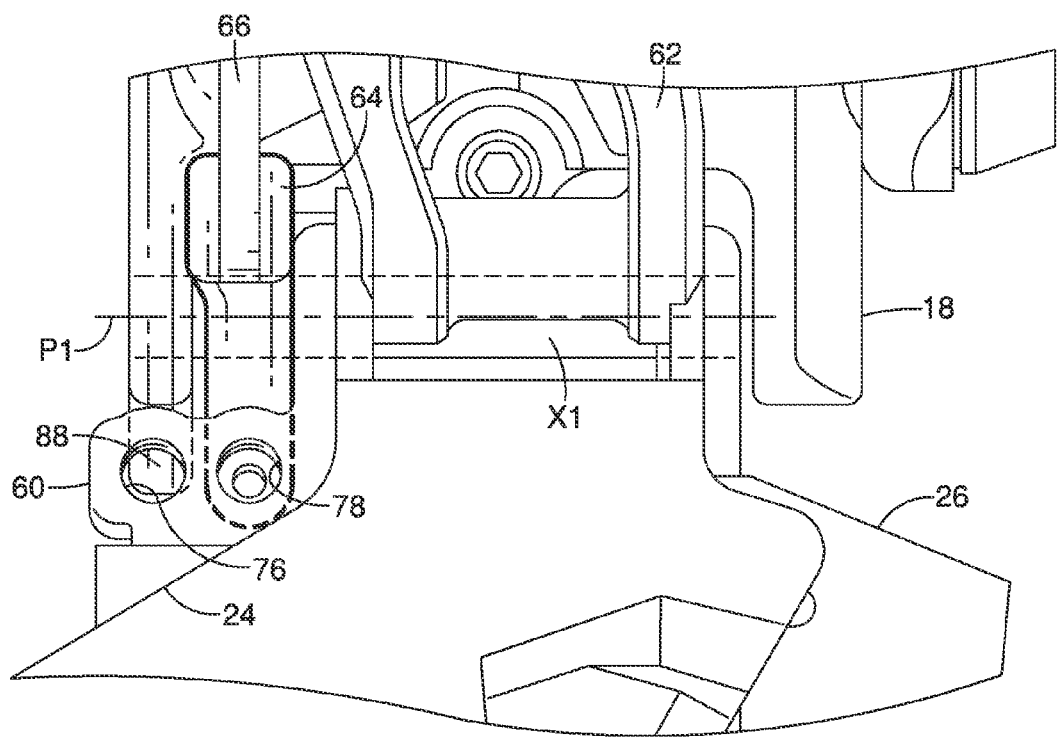
FIG. 12 is an inside elevational view of a portion of the front derailleur illustrated in FIGS. 1 to 11 with the first and second adjusting members removed to show the first and second attachment portions of the first link.

As previously mentioned, the first and second adjusting members M1 and M2 are disposed on the first link 60 of the linkage assembly 20. Specifically, as best seen in FIG. 12, the first link 60 includes a first attachment portion 76 to which the first adjusting member M1 is attached. The first link 60 also includes a second attachment portion 78 to which the second adjusting member M2 is attached. In the illustrated embodiment, the first and second attachment portions 76 and 78 are threaded bores for receiving the first and second adjusting members M1 and M2, respectively. In the first illustrated embodiment, the first and second attachment portions 76 and 78 are aligned to each other in a direction parallel to the first pivot axis P1 as seen in FIG. 12.

Preferably, the first attachment portion 76 is disposed on the upstream side of the first pivoting portion 60a of the first link 60 with respect to the chain running direction D of the chain guide 16. Similarly, the second attachment portion 78 is also disposed on the upstream side of the first pivoting portion 60a with respect to the chain running direction D of the chain guide 16. Thus, the first and second attachment portions 76 and 78 are disposed on the upstream side of the first pivot axis P1 with respect to the chain running direction D of the chain guide 16. As previously mentioned, the upstream side also corresponds to a rearward side of the derailleur 12 when the derailleur 12 is mounted to the bicycle frame F. Disposing the first and second attachment portions 76 and 78 on the rearward side of the derailleur 12 allows for a compact derailleur structure that does not exceedingly protrude outwardly from the bicycle frame F.

As previously mentioned, the first and second adjusting members M1 and M2 are threaded screws. As best seen in FIGS. 9 and 10, the first adjusting member M1 includes a first tool access portion 80 and a first threaded portion 82 adjustably threaded into the first link 60 The first tool access portion 80 is a recessed portion configured to receive a hex key (not shown) or other tool to screw the first adjusting member M1 into and out of the first link 60. In this manner, the first adjusting member M1 is movably attached to the first link 60 such that the position of the first adjusting member M1 relative to the first link 60 is adjustably changed. Preferably, when the derailleur 12 is viewed from the either upstream or downstream side of the chain running direction D, the first tool access portion 80 is disposed laterally closer to the chain guide 16 than the first threaded portion 82. In other words, the first threaded portion 82 is disposed closer to the bicycle frame F than the first tool access portion 80 when the derailleur 12 is mounted to the bicycle frame F. As a result, the first tool access portion 80 is disposed on the side of the first link 60 facing in a laterally outward direction with respect to the bicycle frame F. This arrangement of the first tool access portion 80 permits a rider's easy access to the first tool access portion 80 in order to adjust the first adjusting member M1. In the illustrated embodiment, the first tool access portion 80 is also disposed such that it is accessible from a direction vertically above the chain guide 16 when the derailleur 12 is mounted to the bicycle frame F. Alternatively, it will be apparent to one skilled in the art from this disclosure that the first tool access portion 80 can be disposed on the side of the first link 60 facing in a laterally inward direction with respect to the bicycle frame F.

Similarly, as best seen in FIGS. 7 and 8, the second adjusting member M2 includes a second threaded portion 84 and a second tool access portion 86. The second adjusting member M2 is preferably identical to the first adjusting member M1. The second adjusting member M2 is also (preferably oriented on the first link 60 in the same manner as the first adjusting member M1. That is, in the illustrated embodiment, the second tool access portion 86 is disposed laterally closer to the chain guide 16 than the second threaded portion 84. As previously mentioned, the first and second attachment portions 76 and 78 are horizontally aligned in a direction parallel to the first pivot axis P1, such that the first and second adjusting members M1 and M2 are similarly horizontally aligned. In this manner, the second tool access portion 86 is also disposed such that a tool (not shown) can access the second tool access portion 86 at the space vertically above the chain guide 16 when the derailleur 12 is mounted to the bicycle frame F. Of course, as with the first adjusting member M1, it will be apparent to those skilled in the art from this disclosure that the second adjusting member M2 may be rearranged on the derailleur 12 such that the second access portion 86 is disposed facing in a laterally inward direction with respect to the bicycle frame F. Also, as with the first adjusting member M1, a rider can adjust the second adjusting member M2 by means of a tool (not shown) configured to cooperate with the second tool access portion 86 to screw the second adjusting member M2 into and out of the first link 60. In this manner, the second adjusting member M2 is movably attached to the first link 60 such that the position of the second adjusting members M2 relative to the first link 60 is adjustably changed.

The adjustment mechanism of the first adjusting member M1 will now be discussed, with reference to FIGS. 9 and 10. As previously mentioned, the first adjusting member M1 is operatively disposed on the first link 60 to contact one of the base member 18 and the chain guide 16 to restrict the movement of the chain guide 16 at one of the retracted position and the extended position. In the illustrated embodiment, the first adjusting member M1 is configured to contact the base member 18 to define the retracted position of the chain guide 16. That is, the location of the first adjusting member M1 determines the starting position of a bicycle gear shift operation in which the derailleur 12 shifts from the retracted state (FIG. 9) to the extended state (FIG. 10). In other words, the location of the first adjusting member MI determines the rest position of the chain guide 16. It will be apparent to those skilled in the art from this disclosure that the first adjusting member M1 can also be configured to contact the chain guide 16 to restrict the retracted or extended position of the chain guide 16. The first adjusting member M1 can be conventionally known as a limit-stop screw because it adjusts one of the starting or end limit of the chain guide 16 during a gear shifting operation. In the illustrated embodiment, the first adjusting member M1 is a low adjust limit-stop screw because it adjusts the retracted or rest position of the chain guide 16. In this manner, the first adjusting member M1 also adjusts the range of movement of the chain guide 16 during a gear shifting operation.

In the illustrated embodiment, the first adjusting member M1 is disposed on the first link 60 to contact the base member 18 at the retracted position of the chain guide 16. Preferably, the base member 18 includes a contacting portion 88. Specifically, the contacting portion 88 protrudes from the lower connecting portion 40 of the base member 18, and is configured to contact the first adjusting member M1 when the chain guide 16 is positioned in the retracted position. In other words, the contacting portion 88 extends from the first pivot axis P1 in a downward direction toward the second pivot axis P2. In this way, the first adjusting member M1 is disposed between the first and second pivot axes P1 and P2 to contact the contacting portion 88 of the base member 18. Thus, the first adjusting member M1 contacts the base member 18 when the chain guide 16 is in the retracted position. Specifically, the first adjusting member M1 has a first distal end 89 adjacent the first threaded portion 82. The first distal end 89 contacts the contacting portion 88 of the base member 18 when the chain guide 16 is in the retracted position.

When the chain guide 16 is moved toward the extended position, the first link 60 pivots about the first pivot axis P1 in a counterclockwise direction, as viewed from the upstream side of the chain running direction D, to shift the chain guide 16. As the first link 60 pivots to shift the chain guide 16, the first adjusting member M1 moves away from the base member 18 towards the laterally outward direction. The first distal end 89 of the first adjusting member M1 and the connecting portion 88 are therefore separated by a space when the chain guide 16 is in the extended position (FIG. 10).

The adjustment mechanism of the second adjusting member M2 will now be discussed with reference to FIGS. 7 and 8. In the illustrated embodiment, the second adjusting member M2 is configured to adjust the extended position of the chain guide 16. As previously mentioned, the second adjusting member M2 is attached to second attachment portion 78 of the first link 60. Specifically, the second adjusting member M2 is threadedly screwed into the second attachment portion 78 to adjust the extended position of the chain guide 16 so that the position of the second adjusting member M2 with respect to the second attachment portion 78 is changed. In the illustrated embodiment, the second adjusting member M2 is threadedly screwed into the first link 60 such that a second distal end 90 of the second threaded portion 84 extends out of the second attachment portion 78 to contact the extension link 64. Thus, second adjusting member M2 is movably attached to one of the first link 60 and the extension link 64. The degree to which the second adjusting member M2 extends out of the first link 60 determines the angular orientation of the extension link 64 with respect to the first link 60. Thus, by adjusting the second adjusting member M2, a rider can adjust the angular orientation of the extension link 64 with respect to the first link 60. Specifically, the second adjusting member M2 is configured to adjust the relative angular orientation between the first link 60 and the extension link 64 about the first pivot axis P1. In this way, the second adjusting member M2 contacts the extension link 64 at the second distal end 90 when the chain guide 16 is in either the retracted position (FIG. 7) or the extended position (FIG. 8). Adjusting the angular orientation of the extension link 64 will in turn adjust the angular orientation of the connecting link 66 and the input link 22. In this manner, a rider may fine tune the derailleur 12 such that the sufficient shifting force to shift the chain C from the small chain ring S1 to the large chain ring S2 is obtained and the sprockets are optimally oriented between the chain receiving slot L of the chain guide 16. In this way, contact of the portion of the chain C disposed in the slot L with the chain guide 16 is avoided in a state where the chain C is engaged with the large chain ring S2.

By adjusting the angular orientation between the first link 60 and the extension link 64, the second adjusting member M2 thereby adjusts rest position of the extension link 6.4. In this manner, the second adjusting member M2 also serves to adjust the extended position of the chain guide 16. That is, by adjusting the angular orientation between the first link 60 and the extension link 64 about the first pivot axis P1, the second adjusting member M2 adjusts the extent to which the extension link 64 can pivot about the first pivot axis P1 during a gear shift operation. The degree of which the extension link 64 pivots about the first pivot axis P1 determines the stroke of the extension link 64, which then determines the stroke of the connecting link 66 and the input link 22 during a gear shifting operation. In this manner, the second adjusting member M2 adjusts the extended position of the chain guide 16 by adjusting the stroke of the extension link 64, the connecting link 66 and the input link 22.

The second adjusting member M2 of the illustrated embodiment is an example of a stroke adjust bolt. Typically, the stroke adjust bolt adjusts a stroke of the chain guide 16 from the retracted position to the extended position. As a result of adjusting the stroke, the extended position is adjusted (changed) such that a top adjust bolt (i.e., a second limit stop screw) is not needed. However, the stroke adjust bolt only adjusts the stroke (as a result, it adjusts the extended position of the chain guide 16). So, to adjust the retracted position, the low adjust bolt (e.g., the first adjusting member M1) is necessary. As previously mentioned, the second adjusting member M2 of the illustrated embodiment may be movably attached to one of the first link 60 and the extension link 64, Referring now to FIGS. 13 and 14, a modified derailleur 112 in accordance with a second illustrated embodiment will now be discussed. Basically, the derailleur 112 is identical to the derailleur 12, except that the first link 60 and the second link 162 have been replaced with a modified first link 160 and a modified second link 162. The second link 162 is configured to have the operation cable 14 attached thereto. In other words, the input force generated by a gear shifting operation is received directly by the second link 162 (versus the input link 22 of the derailleur 12). As a result, in the derailleur 112 does not include an extension link, a connecting link member or an input link. In view of the similarity between the derailleurs 12 and 112, the derailleur 112 will only be briefly discussed for the sake of brevity.

Basically, the derailleur 112 includes a chain guide 116, a base member 118, and a linkage assembly 120. The linkage assembly 120 has a first link 160 and a second link 162 that forms a four-bar linkage with the chain guide 116 and the base member 118. The derailleur 112 further includes a first adjusting member 2M1 and a second adjusting member 2M2. The first adjusting member 2M1 and the second adjusting member 2M2 are screws that are threaded into the first link 160. The base member 118 is non-movably mounted to the bicycle frame F at a bicycle mounting portion 134 of the base member 118. The base member 118 includes a lower connecting portion 140 and an upper connecting portion (not shown). The chain guide 116 is configured to be movable between a retracted position and an extended position with respect to the base member 118 via the linkage assembly 120.

The first link 160 is pivotally attached to the lower connecting portion 140 of the base member 118 by a first pivot axle 2X1 at a first pivot axis 2P1. The first link 160 is further pivotally attached to the chain guide 16 at a second pivot axis 2P2. The second link 162 is pivotally attached to the upper connecting portion of base member 118 at a third pivot axis 2P3. The second link 162 is pivotally attached to the chain guide 16 at a fourth pivot axis 2P4. Thus, the first and second links 160 and 162 define a four bar linkage that pivotally connects the chain guide 116 to the base member 118.

As previously mentioned, the derailleur 112 does not include an input link member. As a result, the second link 162 does not have an upper protruding portion that serves to prevent debris from entering into the space between the second link 162 and an input link. Also, as previously mentioned, the second link 162 receives the operation cable 14, and thus receives the rider input force during a gear shifting operation that moves chain guide 116 from the retract position to the extended position. In this regard, the second link 162 has a cable attachment part 150 to which the operation cable 14 is attached. Specifically, in the illustrated embodiment shown, the cable attachment part 150 of the second link 162 is a cable anchoring arm 192. The cable anchoring arm 192 is formed as an integral part of the second link 162, and extends toward the bicycle frame F when the derailleur 112 is mounted to the bicycle frame F. A cable anchoring part 194 is disposed on the extended distal end of the cable anchoring arm 192 for bolting down the inner wire 14a of the operating cable 14. The second link 162 is preferably constructed of a metal to withstand the strain from the operation cable 14 during a gear shifting operation.

The first link 160 has the first and second adjusting members 2M1 and 2M2 movably attached thereon such that the position of the first and second adjusting members 2M1 and 2M2 relative to the first link 160 is adjustably changed. Similar to the first embodiment, the first adjusting member 2M1 includes a first tool access portion 180 and a first threaded portion 182. The second adjusting member 2M2 includes a second threaded portion 184 and a second tool access portion 186. The first link 160 has first and second attachment portions 176 and 178 that are threaded bores for receiving the first and second threaded portions 182 and 184, respectively. Thus, the first and second threaded portions 182 and 184 of the first and second adjusting members 2M1 and 2M2 are threaded into the first link 160. In the derailleur 112, the first attachment portion 176 is disposed below the first pivot axis 2P1 while the second attachment portion 178 is disposed above the first pivot axis 2P1.

Figure 13:
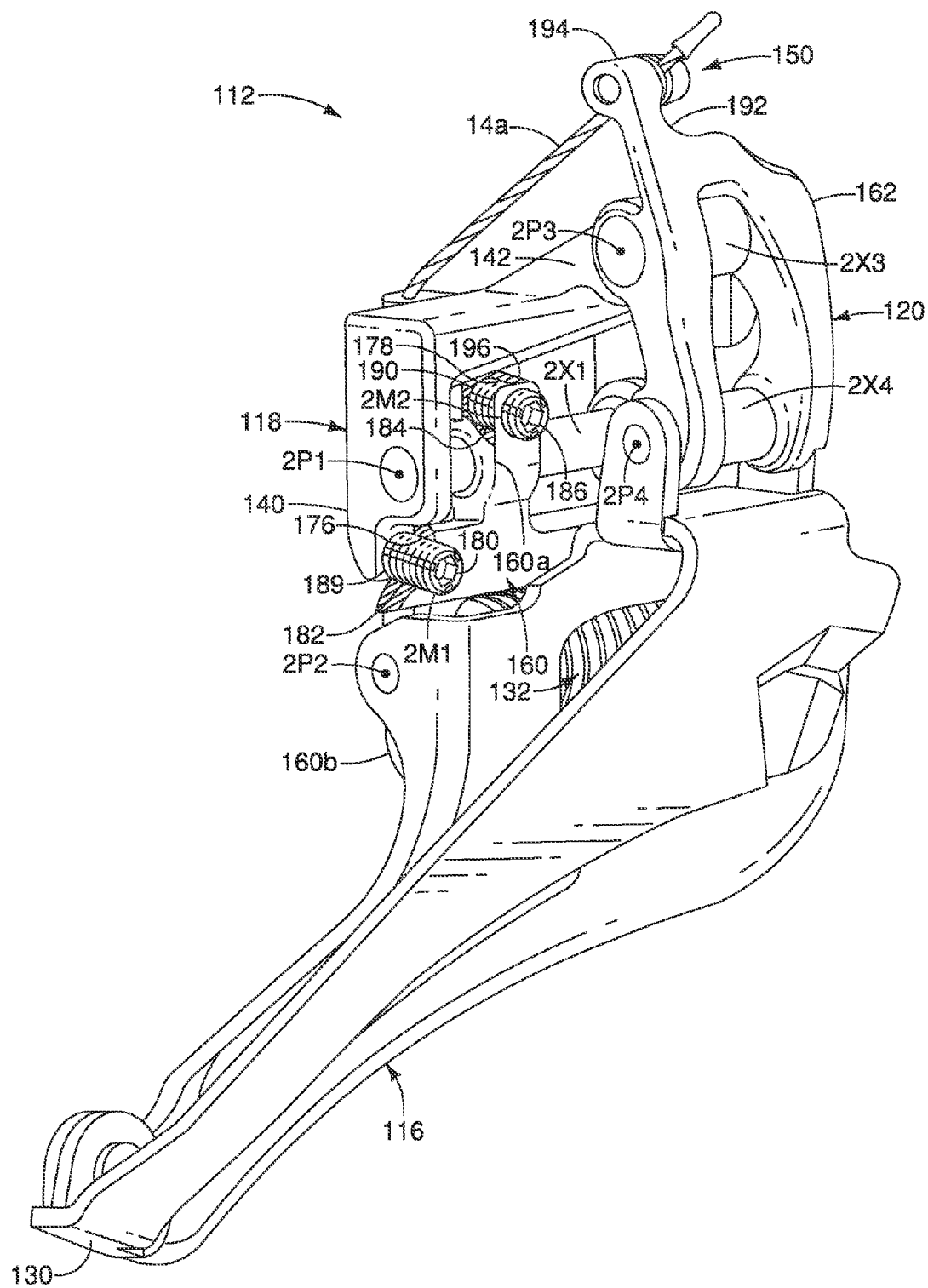
FIG. 13 is a rear outside perspective view of a front derailleur in accordance with a second illustrated embodiment with portions of the first link broken away to illustrate the first and second adjusting members.

As shown in FIG. 13, the first and second tool access portions 180 and 186 are disposed laterally closer to the chain guide 116 than the first and second threaded portions 182 and 184. In other words, the first and second tool access portions 180 and 186 are facing away from the bicycle frame F toward the second link 162 when the derailleur 112 is mounted to the bicycle frame F. Given this orientation of the first and second adjusting members 2M1 and 2M2, a tool (not shown) may access the first and second tool access portions 180 and 186 via the space between the first and second adjusting members 2M1 and 2M2 and an upper connecting portion of the chain guide 116.

Similar to the first adjusting member M1 of the first illustrated embodiment, the first adjusting member 2M1 is a limit-stop screw that is configured to contact one of the base member 118 and the chain guide 116 to restrict the movement of the chain guide 116 at one of the retracted and extended positions. In the illustrated embodiment, the first adjusting member 2M1 contacts the base member 118 to restrict the movement of the chain guide 116 at the retracted position. In particular, the first threaded portion 182 has a first distal end 189 that contacts the base member 118 when the chain guide 116 is in the retracted position. In other words, the first adjusting member 2M1 adjusts the start position of a gear stroke during gear shifting outwardly, and the end position of the gear shifting of a gear stroke during gear shifting inwardly. It will be apparent to those skilled in the art from this disclosure that the first adjusting member 2M1 can be configured to contact the chain guide 116 to restrict the movement of the chain guide 116 at one of the retracted and extended positions. The arrangement, orientation and mechanism of the first adjusting member 2M1 are identical to the arrangement, orientation and mechanism of the first adjusting member M1. Thus, the first adjusting member 2M1 will not be further discussed for the sake of brevity.

Figure 14:
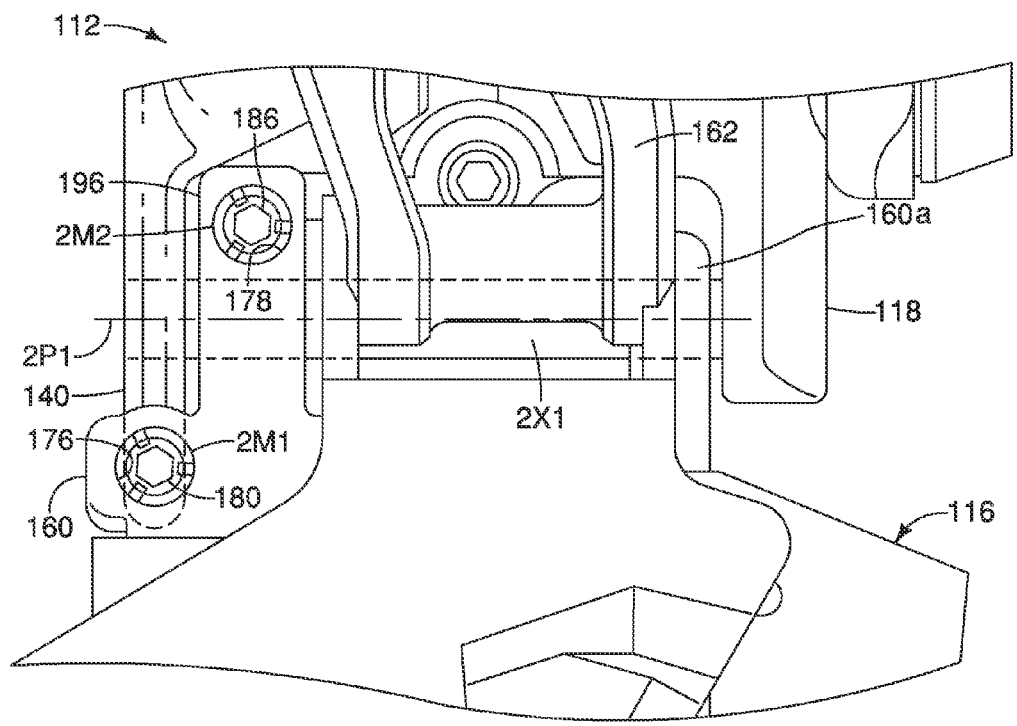
FIG. 14 is an inside elevational view of a portion of the front derailleur illustrated in FIG. 13 showing the first and second adjusting members attached to the first link.

In the illustrated embodiment, the second adjusting member 2M2 is configured to contact the base member 118 to define the extended position of the chain guide 116. Further, the second adjusting member 2M2 is configured to be threadedly attached to the first link 160 so that the position of the second adjusting member 2M2 relative to the first link 160 is changed to adjust the extended position of the chain guide 116. As previously mentioned, the second attachment portion 178 of the first link. 160 receives the second threaded portion 184 of the second adjusting member 2M2. As best seen in FIGS. 13 and 14, the first link. 160 includes a first pivoting portion 160a which is a pair of mounting flanges having a pair of mounting holes that receives the first pivot axle 2X1 that pivotally couples the first link 160 to the base member 118. The second attachment portion 178 is disposed on an upwardly protruding portion 196 of the first link 160. The upwardly protruding portion 196 extends from the first pivoting portion 160a in an upward direction with respect to the first pivot axis 2P1. In the second embodiment, the first adjusting member 2M1 is disposed below the first pivot axis 2P1 and the second adjusting member 2M2 is disposed above the first pivot axis 2P1. As a result, in the derailleur 112, the first pivot axis 2P1 is disposed between the first and second adjusting members 2M1 and 2M2 as viewed from a direction parallel to the first pivot axis 2P1.

During a gear shifting operation from the small chain ring S1 to the large chain ring S2, the first link 160 pivots about the first pivot axis 2P1 in a counterclockwise direction as viewed from the upstream side of the chain running direction D. As a result, the first link 160 pivots such that the first adjusting member 2M1 moves in an outward direction away from the base member 118 to create a space between the first adjusting member 2M1 and the base member 118. At the same time, the upwardly protruding portion 196 of the first link 160 moves in an inward direction toward the base member 118 so that the second adjusting member 2M2 contacts the base member 118. Thus, a second distal end 190 of the second threaded portion 184 of the second adjusting member 2M2 contacts the base member 118 when the chain guide 116 is in the extended position to restrict the movement of the chain guide 116 outwardly. In the derailleur 112, the second adjusting member 2M2 is also a limit-stop screw because it is configured to contact the base member 118 when the chain guide 116 is in the extended position, thereby stopping the outward extension movement of the chain guide 116 during a gear shifting operation. In this way, the second adjustment member 2M2 adjusts the end limit of a gear shift stroke.

Figure 15:
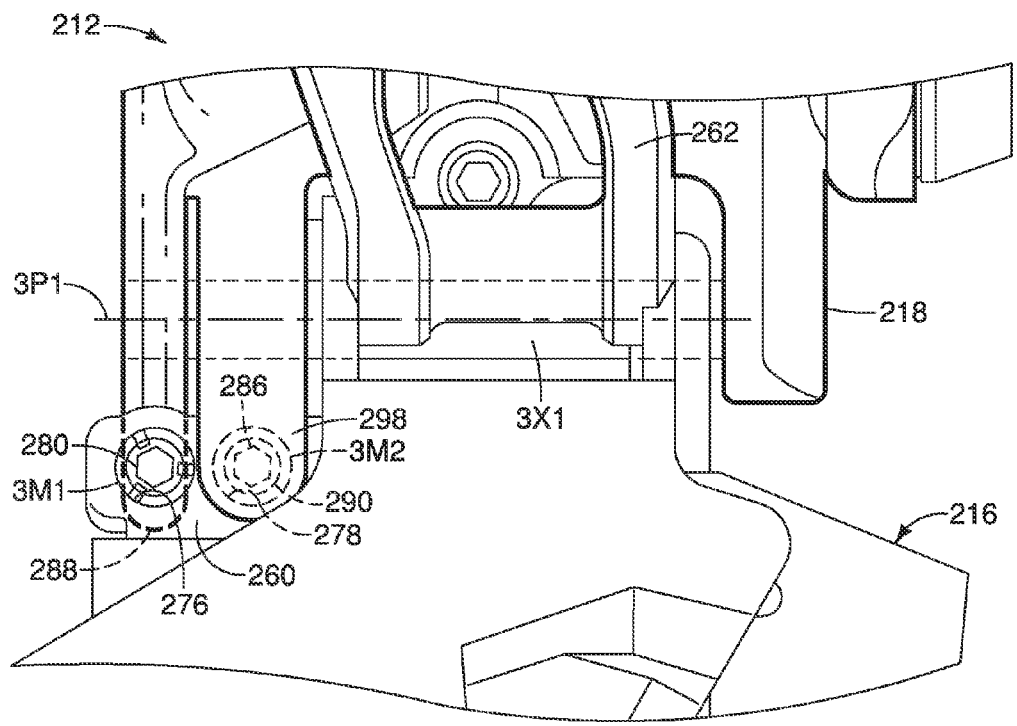
FIG. 15 is an inside elevational view of a portion of a front derailleur in accordance with a third illustrated embodiment.

Referring now FIG. 15, a modified derailleur 212 in accordance with a third illustrated embodiment will now be discussed. Basically, the derailleur 212 includes a chain guide 216, a base member 218 and a linkage assembly 220. The derailleur 212 further includes a first adjusting member 3M1 and a second adjusting member 3M2. The linkage assembly 220 has a first link 260 and a second link 262 that forms a four-bar linkage with the chain guide 216 and the base member 218. The first adjusting member 3M1 and the second adjusting member 3M2 are screws that are threaded into the first link 260. In view of the similarity between the derailleurs 112 and 212, the derailleur 212 will only be briefly discussed for the sake of brevity.

Generally, the derailleur 212 is identical to the derailleur 112, except that the base member 118 has been replaced with the base member 218 and the first link 160 has been replaced the first link 260. The base member 218 has a first contacting portion 288 configured to contact the first adjusting member 3M1, while the base member 218 has a second contacting portion 298 configured to contact the second adjusting member 3M2. In the illustrated embodiment, the second contacting portion 298 is a downward protruding portion that contacts the second adjusting member 3M2 during a gear shifting operation outwardly. Also in the illustrated embodiment, the first contacting portion 288 is disposed on a downward protruding portion of the base member 218. In other words, when the derailleur 212 is mounted to the bicycle frame F, the first contacting portion 288 is disposed laterally closer to the bicycle frame F than the second contacting portion 298.

The first link 260 has the first and second adjusting members 3M1 and 3M2 movably attached thereon such that the position of the first and second adjusting members 3M1 and 3M2 relative to the first link 260 is adjustably changed. The second link 262 receives the operation cable (not shown) that, and thus receives the input force during a gear shifting operation. The second link 262 is same configuration as the second link 162 of the second embodiment.

The first link 260 is pivotally attached to the base member 218 at a first pivot axis 3P1, and is pivotally attached to the chain guide 216 at a second pivot axis 3P2 (not shown). The first link 260 has a first attachment portion 276 and a second attachment portion 278 that are configured to receive the first and second adjusting members 3M1 and 3M2, respectively. The first and second attachment portions 276 and 278 are threaded bores. The first adjusting member 3M1 has a first tool access portion 280 and a first threaded portion (not shown). The second adjusting member 3M2 has a second tool access portion 286 and a second threaded portion (not shown). The first threaded portion of the first adjusting member 3M1 is threaded into the first attachment portion 276 of the first link 260. The second threaded portion of the second adjusting member 3M2 is threaded into a second attachment portion 278 of the first link 260. The first adjusting member 3M1 is threaded into the first link 260 such that the first tool access portion 280 faces the direction away from the bicycle frame F and toward the second link 262. In contrast, the second adjusting member 3M2 is threaded into the first link 260 such that the second tool access portion 286 faces the direction toward the bicycle frame F and away from the second link 262. In other words, the second tool access portion 286 is disposed farther from the chain guide 216 than the second threaded portion 284.

As the first and second attachment portions 276 and 278 are adjacent to each other on the first link 260 such that the first and second adjusting members 3M1 and 3M2 are disposed adjacent to each other on the first link 260. As shown, the first and second adjusting members 3M1 and 3M2 are disposed on the first link 260 so as to be aligned to each other in a direction parallel to and below the first pivot axis 3P1. Given this configuration of the first and second adjusting members 3M1 and 3M2, during a gear shift operation from the small chain ring S1 to the large chain ring S2, the first link 260 pivots about the first axis 3P1 in a counterclockwise direction when viewed from the upstream side of the chain running direction D. Thus, the first and second adjusting members 3M1 and 3M2 move laterally outward with the first link 260 during a gear shifting operation to shift the chain guide 2.16 from the retracted position to the extended position.

In the derailleur 212, the first and second adjusting members 3M1 and 3M2 are limit-stop screws. Specifically, in the illustrated embodiment, the first adjusting member 3M1 is configured to contact the base member 218 to define the retracted position of the chain guide 216. The second adjusting member 3M2 is configured to contact the base member 218 to define the extended position of the chain guide 216. In other words, the first adjusting member 3M1 adjusts the start position of a gear shift stroke, while the second adjusting member 3M2 adjusts the end position of a gear shift stroke, in the gear shifting operation from the small chain ring S1 to the large chain ring S2. As previously mentioned, the second adjusting member 3M2 is threaded into the first link 260 such that the second tool access portion 286 faces the direction toward the bicycle frame F and away from the second link 262 when the derailleur 212 is mounted to the bicycle frame. With this orientation, the second threaded portion 284 has a second distal end 290 that contacts the second contacting portion 298 of the base member 218 that is disposed laterally farther from the bicycle frame F than the first contacting portion 288 when the chain guide 216 is in the retracted (i.e., rest) position.

When the chain guide 216 is in the retracted position, a first distal end of the first threaded portion (not shown) contacts the first contacting portion 288 of the base member 218, while there is a space between the second adjusting member 3M2 and the base member 218. Specifically, there is a space between the second adjusting member 3M2 and the second contacting portion 298 of the base member 218. During a gear shifting operation, the first link. 260 pivots about the first axis 3P1 causing the first adjusting member 3M1 to move away from the first contacting portion 288 of the base member 218 such that a space forms therebetween. As the same time, the second adjusting member 3M2 moves closer to the second contacting portion 298 of the base member 218. When the chain guide 216 is in the fully extended position, the second adjusting member 3M2 contacts the second contacting portion 298 of the base member 218. In this way, the second distal end 290 of the second adjusting member 3M2 is configured to contact one of the base member 218 and the chain guide 216 when the chain guide 216 is positioned to the extended position.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle derailleur. Accordingly, these directional terms, as utilized to describe the bicycle derailleur should be interpreted relative to a bicycle in an upright riding position on a horizontal surface and that is equipped with the bicycle derailleur, The terms "left" and "right" are used to indicate the "right" when referencing from the right side as viewed from the rear of the bicycle, and the "left" when referencing from the left side as viewed from the rear of the bicycle, Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle derailleur comprising:
    a base member configured to be mounted to a bicycle frame;
    a chain guide pivotally supported with respect to the base member between a retracted position and an extended position that is farther from the bicycle frame than the retracted position;
    a linkage assembly including a first link pivotally coupled to the base member about a first pivot axis and pivotally coupled to the chain guide about a second pivot axis, and a second link pivotally coupling the base member to the chain guide, the second link being farther from the bicycle frame than the first link in a state where the base member is mounted to the bicycle frame; and
    a first adjusting member movably attached to the first link, the first adjusting member being configured to contact one of the base member and the chain guide to restrict a movement of the chain guide at one of the retracted position and the extended position of the chain guide.

2. The bicycle derailleur according to claim 1, wherein the first adjusting member is disposed between the first and second pivot axes as viewed from a direction parallel to the first pivot axis.

3. The bicycle derailleur according to claim 2, wherein
the base member includes a connecting portion through which the first pivot axis passes and a contacting portion protruding from the connecting portion, the contacting portion being configured to contact the first adjusting member When the chain guide is positioned in the retracted position.

4. The bicycle derailleur according to claim 1, wherein the first adjusting member is configured to adjust the retracted position.

5. The bicycle derailleur according to claim 4, wherein the first adjusting member includes a first tool access portion and a first threaded portion adjustably threaded into the first link, and the first tool access portion is disposed closer to the chain guide than the first threaded portion.

6. The bicycle derailleur according to claim 5, further comprising
a second adjusting member configured to adjust the extended position, the second adjusting member is movably attached to the first link.

7. The bicycle derailleur according to claim 6, wherein the second adjusting member includes a second threaded portion and a second tool access portion, the second threaded portion is threaded into the first link, and the second tool access portion is disposed farther from the chain guide than the second threaded portion.

8. The bicycle derailleur according to claim 7, wherein the first and second adjusting members are disposed on the first link so as to be aligned to each other in a direction parallel to the first pivot axis.

9. The bicycle derailleur according to claim 8, wherein the second threaded portion has a distal end that is configured to contact one of the base member and the chain guide when the chain guide is positioned to the extended position.

10. The bicycle derailleur according to claim 6, wherein the second adjusting member includes a second threaded portion and a second tool access portion, the second threaded portion is threaded into the first link, and the second tool access portion is disposed closer to the chain guide than the second threaded portion.

11. The bicycle derailleur according to claim 10, wherein the first pivot axis is disposed between the first and second adjusting members as viewed from a direction parallel to the first pivot axis.

12. The bicycle derailleur according to claim 4, wherein the linkage assembly includes an extension link operatively coupled to the first link and pivotally coupled to the base member about the first pivot axis, an input link pivotally supported relative to the base member about a third pivot axis, and a connecting link pivotally connected to the input link about a fourth pivot axis and pivotally connected to the extension link about a fifth pivot axis such that the linkage assembly moves in response to movement of the input link.

13. The bicycle derailleur according to claim 12, wherein the extension link is operatively coupled to the first link via a second adjusting member movably attached to one of the first link and the extension link, the second adjusting member is configured to adjust a relative angular orientation between the first link and the extension link about the first pivot axis.

14. The bicycle derailleur according to claim 7, wherein the second adjusting member is disposed between the first and second pivot axes as viewed from a direction parallel to the first pivot axis.

15. The bicycle derailleur according to claim 14, wherein the first and second adjusting members are disposed on the first link so as to be aligned to each other in the direction parallel to the first pivot axis.

16. The bicycle derailleur according to claim 14, wherein the first and second adjusting members are disposed adjacent to each other.

17. The bicycle derailleur according to clam 1, wherein the first link includes a pivoting portion pivotally coupled to the base member about. the first pivot axis and a first attachment portion to which the first adjusting member is attached, and the first attachment portion is disposed on an upstream side of the pivoting portion with respect to a chain running direction D of the chain guide.

18. The bicycle derailleur according to claim 17, further comprising
a second adjusting member configured to adjust of the other of the retracted position and the extended position of the chain guide, the first link including a second attachment portion to which the second adjusting member is attached, and the second attachment portion is disposed on the upstream side of the pivoting portion with respect to the chain naming direction D of the chain guide.

19. The bicycle derailleur according to, claim 1, wherein the bicycle derailleur is a bicycle front derailleur.

20. The bicycle derailleur according to, claim 19, wherein the first pivot axis is disposed on a vertically upper side of the second pivot axis in a state where the base member is mounted to the bicycle frame.

* * * * *